United States Patent [19]

Kurosu et al.

[11] Patent Number: 5,428,727
[45] Date of Patent: Jun. 27, 1995

[54] METHOD AND SYSTEM FOR REGISTERING AND FILING IMAGE DATA

[76] Inventors: Yasuo Kurosu, 1-37-7 Koyabe, Yokosuka-shi; Seiichi Kanema, 3-5-4 Higiriyama, Kounan-ku, Yokohama-shi; Hitoshi Tachi, Akibadai-ryo A-215, 520-2 Maeda-cho, Totsuka-ku, Yokohama-shi; Hajime Uchiyama, 133-25 Shimobori, Odawara-shi; Masahiro Okumura, 204-6 Chiyo, Odawara-shi; Masaaki Fujinawa, 2196-469 Hirai, Hinode-machi, Nishitama-gun; Naoaki Kubushiro, 4627 Tsukahara, Minamiashigara-shi; Hirowo Shimizu, 4-3-7 Hakoda, Kumagaya-shi, Saitama-ken, all of Japan

[21] Appl. No.: 17,999

[22] Filed: Feb. 16, 1993

Related U.S. Application Data

[63] Continuation of Ser. No. 469,383, Jan. 24, 1990, abandoned.

[30] Foreign Application Priority Data

Jan. 27, 1989 [JP] Japan .................................. 1-16146

[51] Int. Cl.⁶ .............................................. G06F 17/30
[52] U.S. Cl. .................................... 395/147; 395/155; 395/145
[58] Field of Search ........ 395/145, 147, 150, 153–155, 395/146, 131, 600, 934; 340/750

[56] References Cited

U.S. PATENT DOCUMENTS

| | | | |
|---|---|---|---|
| 4,549,275 | 10/1985 | Sukonick | 364/521 |
| 4,683,552 | 7/1987 | Kambayashi et al. | 340/750 X |
| 4,686,525 | 8/1987 | Nagata | 340/735 X |
| 4,933,880 | 6/1990 | Borgendale et al. | 395/147 |
| 4,954,969 | 9/1990 | Tsumora | 395/154 X |
| 5,010,500 | 4/1991 | Makkuni et al. | 395/155 |
| 5,150,458 | 9/1992 | Masuzaki et al. | 395/131 X |

FOREIGN PATENT DOCUMENTS

| | | | |
|---|---|---|---|
| 62-280968A | 5/1986 | Japan | G06F 15/62 |
| 62-241063A | 2/1987 | Japan | G06F 15/20 |
| 63-244285A | 3/1987 | Japan | G06K 9/00 |

Primary Examiner—Almis R. Jankus
Attorney, Agent, or Firm—Antonelli, Terry, Stout & Kraus

[57] ABSTRACT

A system which includes a CAD system and an electronic filing system, wherein when vector data such as figures and their names are converted to image data for storage, the system automatically extracts, from the vector data coming from the CAD system, data that correspond to predetermined character attributes, maximum numeric attributes, primitives of each figure and the topology thereof. The extracted data is set as keywords and made to correspond to the image data for registration and storage in the electronic filing system. In searching for desired image data, key-words corresponding to the desired image data is input for retrieval and output of the desired image data.

75 Claims, 8 Drawing Sheets

FIG. 3

| ATTRIBUTE | FIGURE ATTRIBUTE | COORDINATE 1 | COORDINATE 2 | VALUE |
|---|---|---|---|---|
| NUMERAL | — | x0, y0 | x'0, y'0 | M |
| CONTINUOUS LINE | CIRCLE | x1, y1 | x'1, y'1 | n1 |
| CONTINUOUS LINE | — | x2, y2 | x'2, y'2 | — |
| CONTINUOUS LINE | RECTANGLE | x3, y3 | x'3, y'3 | — |
| CONTINUOUS LINE | — | x4, y4 | x'4, y'4 | — |
| CHARACTER | — | x5, y5 | x'5, y'5 | YAMADA |
| CHARACTER | — | x6, y6 | x'6, y'6 | OHTA |
| CONTINUOUS LINE | CIRCLE | x7, y7 | x'7, y'7 | n2 |
| CHARACTER | — | x8, y8 | x'8, y'8 | JOINING PART |
| NUMERAL | — | x9, y9 | x'9, y'9 | N |
| ⋮ | ⋮ | ⋮ | ⋮ | ⋮ |

NOTE) "———" IN THE FIGURE ATTRIBUTE CORRESPONDING TO "CONTINUOUS LINE" MEANS A STRAIGHT LINE, AND OTHERS MEANS NO VALUES.

FIG. 6A

| ICON CODE | TOPOLOGY INFORMATION | IMAGE INFORMATION | AUXILIARY INFORMATION |
|---|---|---|---|
| 1 | RECTANGLE ↑ CIRCLE | a0, s0 | — |
| 2 | CIRCLE→RECTANGLE→CIRCLE | a1, s1 | f0 |
| 3 | CIRCLE | a2, s2 | f1 |
| ⋮ | ⋮ | ⋮ | ⋮ |

FIG. 6B

| ICON CODE | ICON IMAGE |
|---|---|
| 1 | ○ ▢ |
| 2 | ○▢○ |
| 3 | ○ |
| ⋮ | ⋮ |

METHOD AND SYSTEM FOR REGISTERING AND FILING IMAGE DATA

This application is a continuation of application Ser. No. 07/469,383, filed on Jan. 24, 1990 now abandoned.

BACKGROUND OF THE INVENTION

The present invention relates to an electronic filing system to which a computer aided design (CAD) system or the like is connected and, more particularly, to a method and a system for registering and filing image data whereby any desired portion of image data generated by the CAD system is electronically filed, searched for and extracted automatically through the use of key-words.

In recent years, the electronic filing system has been the newest arrival on the scene of office automation (OA) following the word processor, personal computer and facsimile machine. This newcomer is capable of storing huge amounts of documents and drawings in the form of image data on disks in their drives. The electronic filing system admits source drawings from a scanner, converts them to electronic image data, and stores page after page of the image data on optical disks or similar means. As required, the system retrieves desired portions of the image data and displays or prints them out.

In searching for any portion of image data, the simplest method would be to display and visually verify the data from the first page on through retrieval from disks. The most serious drawback to this method was the obviously low efficiency of the search, evidenced by the uncertainty of when the desired image data is reached and displayed or otherwise output. A widely deployed prior art solution to this problem has been to add key-words to image data as they are registered, the key-words indicating the contents of the data they are attached to. In operation, the desired portion of the image data is searched for by use of the corresponding key-word. Generally, where the image data involve documents, important words or pieces of wording are picked up therefrom and are assigned and input as key-words to the respective portions of the suitably filed data. Where drawings are included, they are identified by drawing names or other appropriate pieces of wording which are input as key-words indicating the contents of the drawings selected. These key-words may be defined as character key-words as opposed to what is proposed below in this specification.

A distinct drawback to the use of character key-words has been that they may not fully express what each drawing or figures therein graphically represent. Another drawback has been that the character key-words are bothersome and difficult to enter from an input device. So another solution to the problem of searching for graphic elements was proposed. This method, disclosed in Japanese Patent Laid-open No. 60-83179, involves the use of key-words graphically representing the characteristic of each figure being filed.

The method is embodied in part by an input and a display device, the input device reading source drawings and the display device outputting the data that were read. The contour of each figure is traced manually by a pointing device (mouse, tablet, etc.). The traced figure is reduced in size and used as a key-word. Because the reduced graphic form is generated by extracting the characteristics of the image it represents, it is easy for the operator to distinguish one reduced figure from another. Thanks to the reduction, a large number of key-words may be displayed simultaneously on a key-word display screen of time display device. When any of the reduced graphic forms on display is picked by the pointing device, the corresponding image data is read from the optical disk for display.

The prior art method outlined above allows figures to be defined as key-words. The operator may use desired external form patterns according to his or her liking as key-words, This feature makes it easier to search optical disks of huge capacities for target images.

The above-mentioned prior art method has significantly improved the efficiency in searching for desired image data. However, there has still remained the bothersome task of having to register the key-words, be they graphic or in character.

In generating external form key-words, the operator must trace the contour of each of the figures entered using the pointing device. Thus the task of registering page after page of image data has consumed inordinate amounts of time.

In generating character key-words, the operator must pick up and manually input suitable words or pieces of wording from the images to be registered. In addition, there are often required not one but a plurality of key-words to one figure for clarification purposes. This requirement has further exacerbated the situation where it takes many man-hours to accomplish the image data registration.

Other prior art methods related to this area include ones disclosed in Japanese Patent Laid-open Nos. 62-72067 and 62-93757.

SUMMARY OF THE INVENTION

It is therefore an object of the present invention to provide a method and a system for registering and filing image data, the method and the system constituting a filing system connected to a CAD system or the like. When the CAD system generates vector data, the filing system accordingly generates character and/or external form key-words for use with image data based on the vector data, and automatically registers the image data by use of the key-words.

It is another object of the present invention to provide a method and a system for registering and filing image data whereby received vector data are converted to raster data to which character and/or external form key-words are assigned for automatic image data registration.

It is still another object of the present invention to provide a method and a system for registering and and filing image data whereby vector data are received and converted to raster data for storage into an electronic filing system. While being stored into the electronic filing system, the raster data are automatically assigned key-words for subsequent search and retrieval.

According to one aspect of the present invention, there is provided an arrangement whereby vector data such as figures are received and converted to image (raster) data. From the vector data, key-words corresponding to the attributes selected are extracted; the key-words are registered together with the image data for subsequent search and retrieval.

According to another aspect of the present invention, there is provided an electronic filing system to which is connected a CAD system generating vector data of figures. A vector-to-raster (image) converter is installed in the electronic filing system. The converter comprises means for automatically extracting key-words from the vector data generated by the CAD system. The extracting means takes advantage of the fact that vector data are made up of such attributes as line types, numeric codes and coordinate values. That is, attributes that adequately represent the characteristics of the figures generated are extracted from the vector data and established beforehand as key-words.

More specifically, the vector-raster converter comprises five kinds or means: (1) means for extracting a file name to be registered, (2) means for extracting a title column of a drawing according to predetermined format information, (3) means for extracting the longest numeric code for a figure in a drawing, (4) means for extracting primitives of each figure and the topology thereof, i.e., a relative positional relationship between major primitives (basic graphic parts) making up the figure, and (5) means for extracting continuous line information representing external forms of vector data, for reducing the information to a predetermined expansion factor, and for extracting from already registered icons the icon code whose degree of similarity to the selected topology is the highest. These means make it possible to automatically extract the appropriate key-words and register them in the electronic filing system together with the converted image data.

In the setup described above, the vector-raster converter is located inside the electronic filing system. Alternatively, the converter may be placed inside the CAD system or between the CAD system and the electronic filing system. According to the present invention, vector data (files) such as figures to be input constitute code information that includes both the vector data to be converted by the converter to raster data and the data to be left unconverted.

According to still another aspect of the present invention, there is provided a vector-raster converter in any of three locations: inside an electronic filing system to which is connected a CAD system or the like generating vector data, between the electronic filing system and the CAD system, or inside the CAD system or the like. The vector-raster converter converts vector data coming from the CAD system into raster data for use by the electronic filing system. At the converting stage, the code information provided by the vector data is utilized to embody the above-described five means.

The first means extracts as a key-word a file name that is sent by the vector generating device to the electronic filing system upon registering image data.

The second means extracts character attribute data from the code information of the vector data so as to generate as a key-word that character code of the code information which falls within the coordinate value previously supplied.

The third means extracts as a key-word the longest code for figures in a drawing as follows: Numeric attributes of the code information are selected and compared in the vertical and horizontal direction before the longest size is picked up. The selected numeric code is used as the key-word.

The fourth means, as described earlier, extracts primitives of a figure and the topology thereof. The fifth means extracts line type attributes of the code information provided by the vector data in order to find from among reduced graphic forms the icon code whose degree of similarity to the selected topology is the highest. Either of these two means receives from the CAD system or the like the vector data that were sorted from a given point of coordinates. All line type attributes of the code information provided by the vector data are extracted, and the extracted vector data are classified into unit graphic forms. From the graphic forms thus classified, there is selected the largest graphic form that provides an external form. Given the external form, the fourth means extracts major primitives therefrom. Since the code information is sorted from a given coordinate point, the consecutively extracted primitives are fixed in their relative positional relationship to one another. This provides a topology of the primitives. The fifth means utilizes the topology in order to determine if there exists an icon code whose similarity to the extracted figure is close enough. This process is made possible because auxiliary information for icon codes contains icon code topologies. If there is an icon code whose topology matches that of the figure, the similarity allows the icon code to be set as the key-word. If there is no icon code having a topology of sufficient similarity, the extracted figure is reduced to a predetermined size and registered anew.

BRIEF DESCRIPTION OF THE DRAWINGS

FIG. 3 is a view illustrating vector data for use in the screen of FIG. 2;

FIG. 6A is a view denoting a data structure of icon codes mentioned in FIG. 5;

FIG. 6B is a view showing icon images that correspond to the icon codes given in FIG. 6A;

DESCRIPTION OF THE PREFERRED EMBODIMENTS

Figure 1:
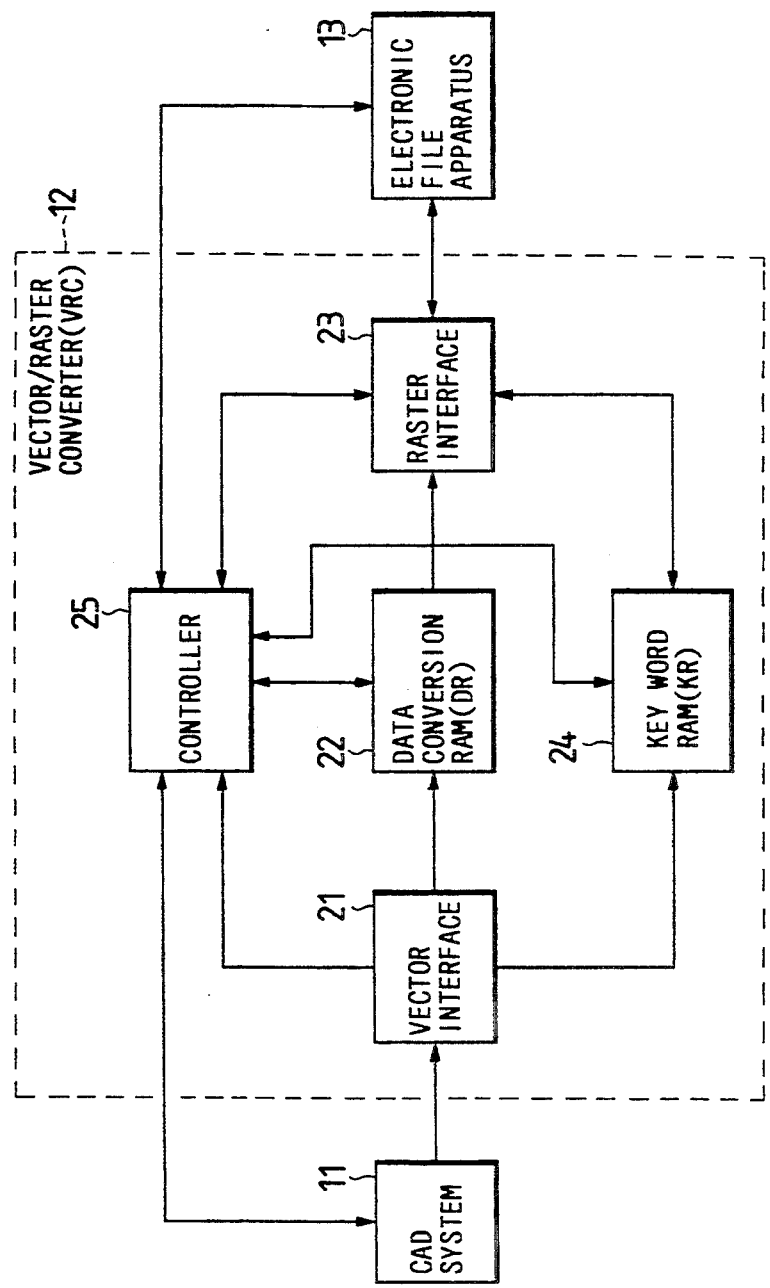
FIG. 1 is a schematic block diagram showing an embodiment of a system for registering image data according to the present invention.
Figure 4:
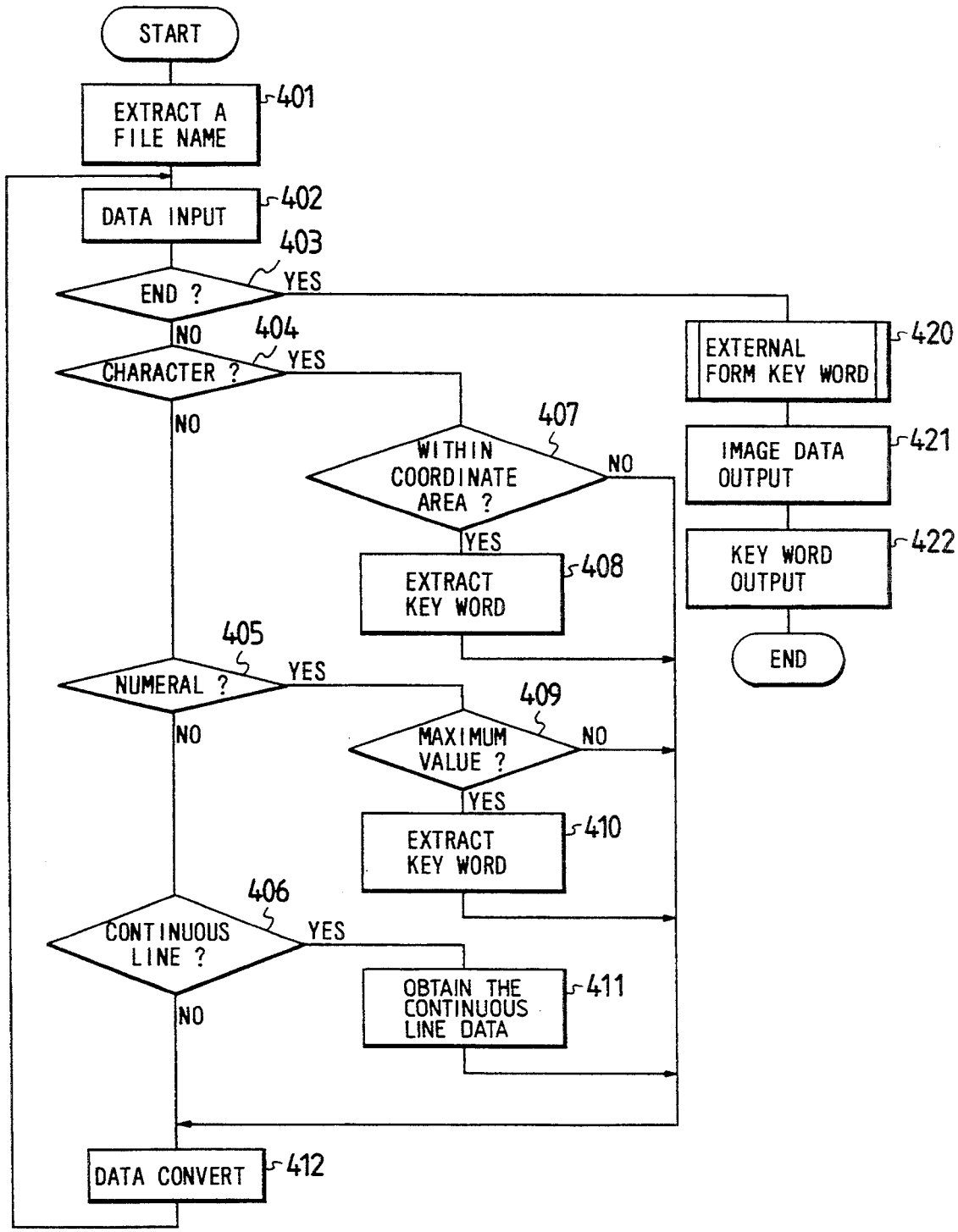
FIGS. 4 is a flowchart showing a typical flow of operations performed by the embodiment of FIG. 1.

There will now be described an embodiment of the present invention by referring to FIG. 1. FIG. 1 shows conceptually how the embodiment is constructed. FIG. 4 depicts the flow of the operations carried out by this embodiment.

Referring to FIG 1, there are provided a CAD system 11 that outputs vector data, a vector-raster converter (also called a data converter) 12 capable of extracting key-words from the vector data, and an electronic filing system 13 that stores and keeps image data. The data converter 12 comprises a vector interface 21 that receives data from the CAD system 11; a data conversion RAM (called the DR) 22 that converts the vector data received via the vector interface 21 into raster data for storage; a raster interface 23 that sends image data along with the key-words thereof to the electronic filing system 13 after data conversion; a key-word RAM (called the KR) 24 that stores the extracted key-words; and a controller 25 that controls the data converter 12 to convert the vector data to raster data.

Figure 2:
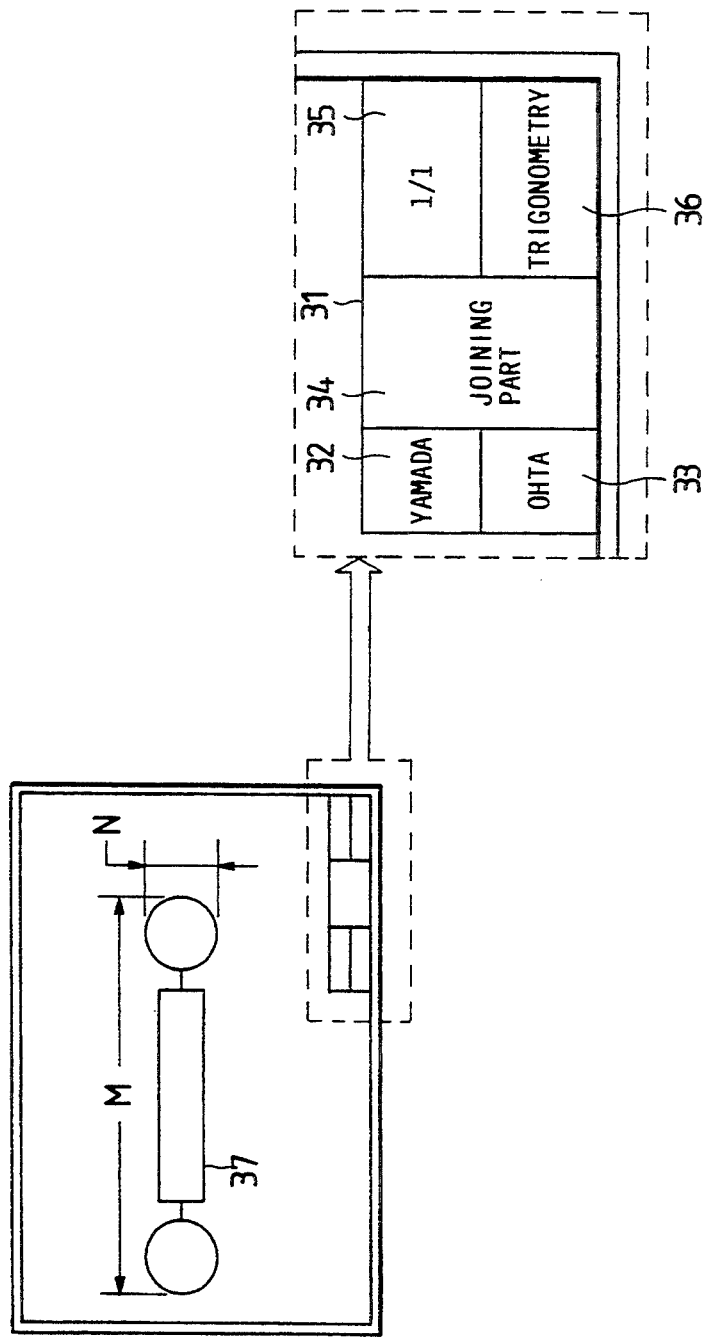
FIG. 2 is a view depicting a typical screen to be registered by the embodiment of FIG. 1.

FIG. 2 shows a typical screen generated by the CAD system 11. FIG. 3 illustrates how the screen of FIG. 2 is constructed so as to be managed by the CAD system 11. That is, what FIG. 3 shows is an example of vector data which is transmitted by the CAD system 11 for processing by the vector interface 21. The data in FIG. 3 are sorted in ascending order by the items of coordinate therein. That is, the data in FIG. 3 are sorted by item "x" of coordinate 1, followed by item "y" thereof. FIG. 3 also contains attribute items, figure attribute items, coordinate 2 items, and value items. The vector data shown in FIG. 3 comprise, from the top downwards, numeric code data indicating the crosswise length of the figures (a circle, a rectangle and another circle) in the drawing of FIG. 2; continuous line data representing a circle, a crosswise straight line, a rectangle, another crosswise straight line and another circle; code data indicating character information in the format information shown in the bottom right corner of the drawing; continuous line data denoting the rightmost circle in the drawing; code data showing a "joining part" in the drawing; and numeric code data indicating the lengthwise length of the figures in the drawing.

Figure 5:
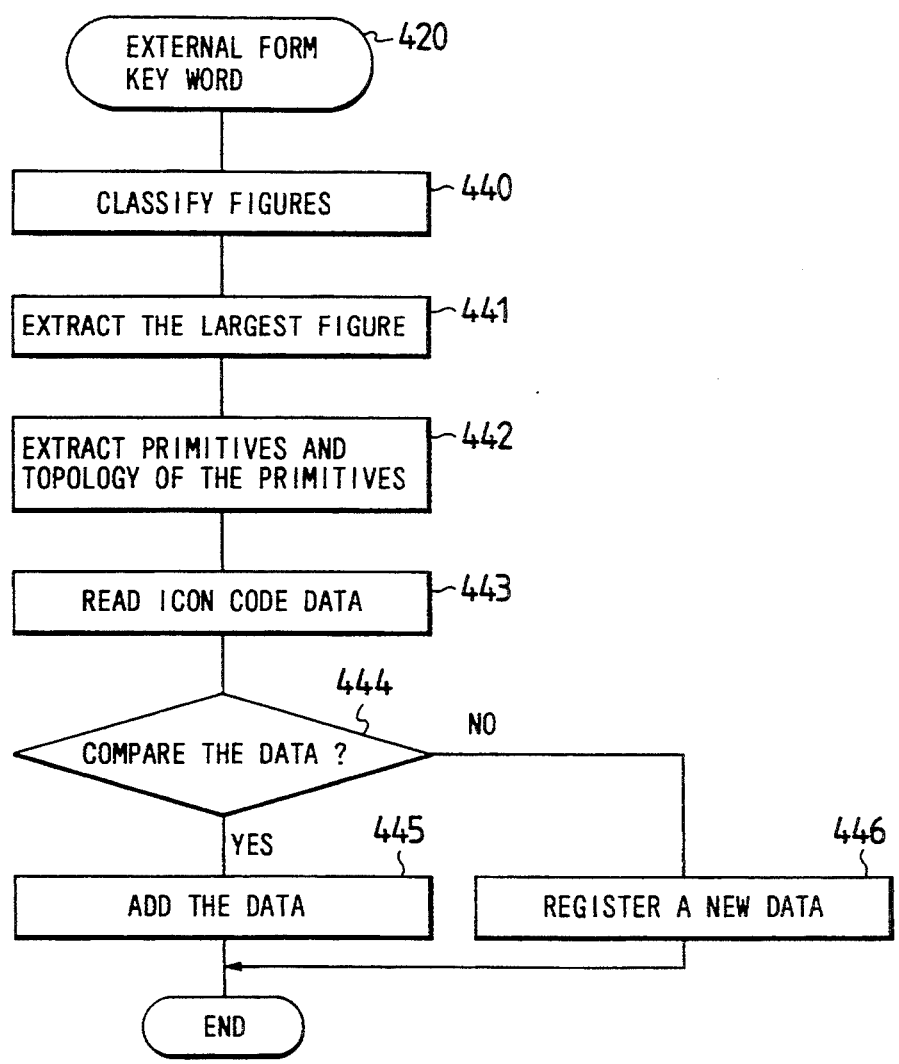
FIG. 5 is a flowchart specifically indicating how external form key-words are extracted in the operational flow of FIG. 4.

Referring now to FIGS. 4 and 5, there will be described how key-words are extracted when image data is registered by this embodiment. In the flow of FIG. 4, step 401 is a process in which a file name is extracted in the form of vector data and established as a key-word. The drawing of FIG. 2 generated by the CAD system 11 for the electronic filing system 13 is registered therein. For use with a registering command, both a source file name and a destination file name are required as in the case of file transfer. The destination file name is a key-word that is required by the electronic filing system 13. The source and destination file names may be one and the same. The destination file name is the first data to be received by the vector interface 21 when image data are to be registered. A destination file name becomes a key-word when stored by the controller 25 into the KR 24.

In step 402, the vector interface 21 receives the vector data of FIG. 3 from the CAD system 11.

In step 403, a check is made to see if the transfer data have been exhausted. If there are still data to be transferred, step 404 is reached; if there are no more data to be transferred, step 420 is reached.

In each of steps 404, 405 and 406, a check is made to judge the attribute of the data. The attribute to be judged is among those shown in FIG. 3. If a character attribute is found, step 407 is reached; if a numeric attribute is detected, step 409 is reached; if a continuous line attribute is encountered, step 411 is reached; otherwise step 412 is reached.

In steps 407 and 408, key-words are extracted according to format information. Format information is a kind of information comprising positional information about characters such as those which are written in the box 31 of FIG. 2 and which indicate the drawing to be registered. In the format information, key-words may be any of character strings 32 through 36 in FIG. 2.

In step 407, a check is made to see if the character coordinates fall within the coordinate range delimited by the box 31 of FIG. 2 being in the bottom rightmost position. If the character coordinates are found within tile range, step 408 is reached in which the character string codes of the value items in FIG. 3 are taken and stored in the KR 24. If the character coordinates are out of the range, step 412 is reached. Step 412 is also reached when step 408 has come to an end.

In step 408, character attribute key-words such as "YAMADA," "OHTA" and "JOINING PART" in FIG. 2 are extracted and stored in the KR 2,.

In steps 409 and 410, the maximum sizes in both the X and the Y direction of the graphic form 37 in FIG. 2 are found from the corresponding numeric data and are used as key-words. In step 409, a check is made to see if any of the value items in FIG. 3 is larger than the maximum sizes found. For calculation, a work area is set aside in the KR 24 and an initial value of 0 is set thereto. Comparisons are made consecutively with the values of numeric attribute data. If a data value is greater than the value in the work area of the KR 24, step 410 is reached. In step 410, the current value in the work area of the KR 24 is replaced by the data value. This process is carried out in both the X and the Y direction. At the end of data transfer, the current value in the work area of the KR 24 is the maximum value which was searched for and is set as the key-word. Step 410 is the process in which the key-words are extracted. If the target data is not the last data in step 409, termination of step 410 is followed by step 412 which is a data conversion process.

In step 411, all continuous line attribute data selected in step 406 are stored consecutively into the KR 24. The data are used later in step 420 in which an external form key-word process is carried out.

Figure 8:
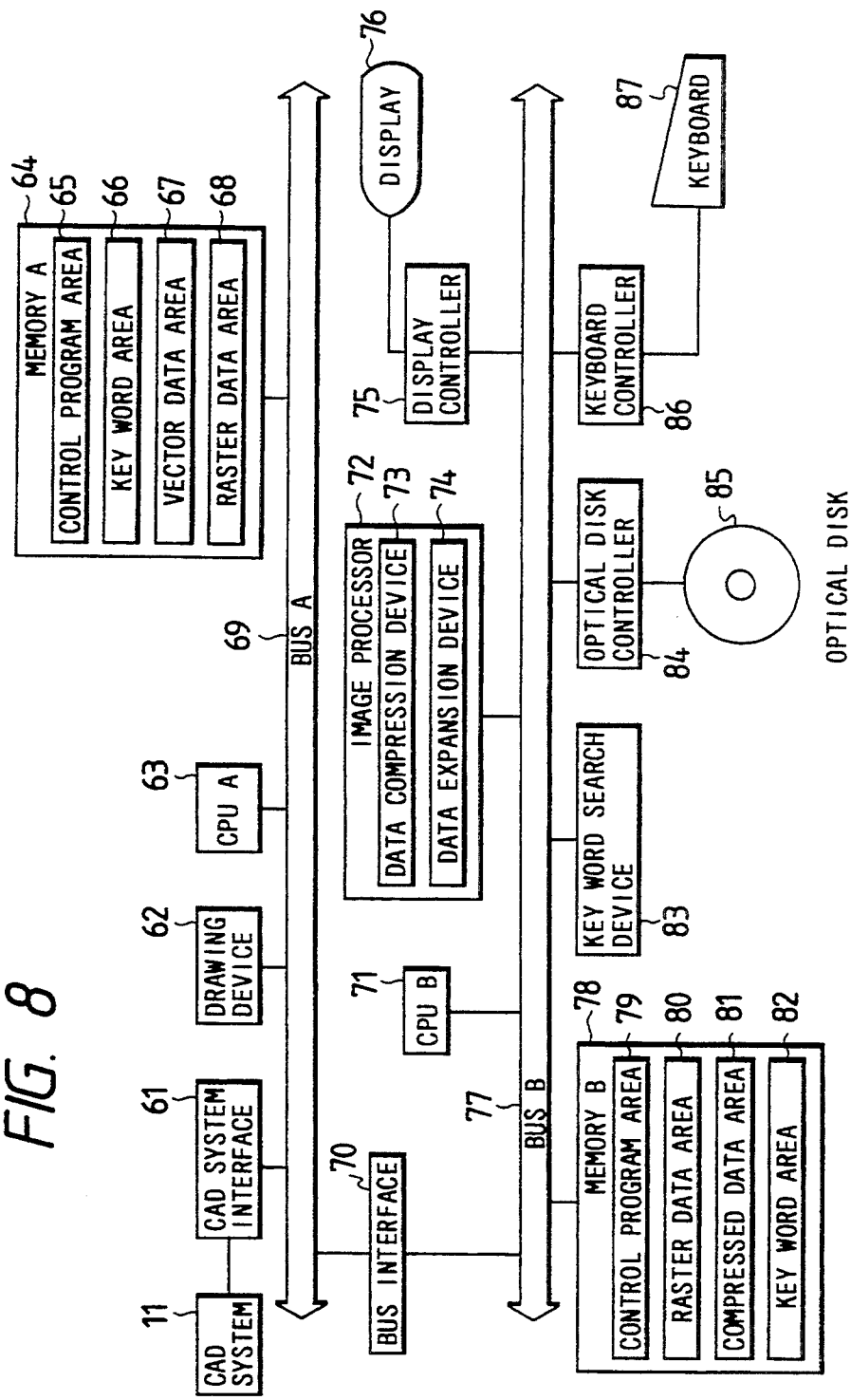
FIG. 8 is a block diagram depicting an embodiment of a system for registering and searching for image data according to the present invention.

In step 412, the vector data that were sent in are converted to raster data. The DR 22 in FIG. 1 are a bit map memory. For this reason, the controller 25 analyzes the vector data that were input via the vector interface 21 and writes them as raster data to suitable locations in the DR 22. Details of the processing involved are better understood by referring to FIG. 8 depicting a typical system according to the present invention.

With the end of input data detected in step 403, all the input data have been placed in the DR 22 as raster data, together with the key-words required.

Step 420 is the process in which external form key-words are extracted from the continuous line attribute data mentioned above. An example of this process is described below by referring to the flowchart of FIG. 5. In step 440 of FIG. 5, the vector data of the continuous line attribute are classified into unit figures. Typically, the data are stored in the DR 24 in the order in which they were found in step 411. Thins the data are read from the KR 24 in that order, and a check is made to see if one piece of data has a point of contact with the next piece of data. All vector data of the continuous line attribute stored in the KR 24 are examined and classified.

In process 441, a check is made on the vector data stored in step 440 for any point of contact. As a result, the vector data are classified in units of at least one figure. The area of each classified figure is calculated so that the largest figure is found. Of the figures shown in FIG. 2, the largest turns out to be the FIG. 37 as a result of the calculation. Thus the FIG. 37 is found and retrieved in step 441 as the largest figure.

In step 442, the primitives making up the figure and the topology interconnecting these primitives are extracted. In this context, a primitive is a basic graphic element which constitutes a figure and which cannot be reduced further, such as a circle, a rectangle or a triangle. From the vector data constituting the FIG. 37 in FIG. 2 detected in step 441, graphic attributes are extracted in the order in which they were found in step 411. This provides extraction of the primitives that make up the figure. The topology thereof is acquired by adding relational symbols of positional information (called auxiliary information) to the extracted primitives. In this manner, the primitives made up of a circle, a rectangle and a circle are extracted, in that order. Auxiliary information made lip of relational symbols (FIG. 6A) in the X direction is placed between the primitives. These symbols are used as key-words indicating the primitives and the topology thereof. The extracted key-words are stored in the KR 24.

Step 443 is then reached so as to extract icon codes, the last of the key-words. In this step, the data shown in FIG. 6A are sent by the electronic filing system 13 (FIG. 1) via the raster interface 23 to the KR 24. The data thus stored in the KR 24 illustratively constitute a data structure table of icon codes that the electronic filing system 13 initially possesses. FIG. 6B depicts the icon images that correspond to the data in FIG. 6A.

In step 444, a comparison is made between the topology information of FIG. 6A read in step 443 and the topology data detected in step 442. If there is found any matching icon code, step 445 is reached; if no matching con code is detected, step 446 is reached.

Where a matching icon code exists and step 445 is reached accordingly, the icon code is associated with the corresponding image data and is stored temporarily in the KR 24.

If no matching icon code is found, an icon code is generated anew in step 446. An expansion factor by which the corresponding figure is reduced is obtained first. Then the continuous line attribute vector data stored after classification and extraction are converted to raster data by the expansion factor obtained, the raster data making up an icon image to be stored in the KR 24. A new icon code is generated and added to the image. Termination of step 445 or 446 is followed by step 421 in FIG. 4.

After the process flow described above, there are stored in the KR 24 the key-words corresponding to five attributes: file name, characters, numeric value, primitives and the topology thereof, and icon code.

In step 421, the raster data after conversion are transferred from the DR 22 via the raster interface 23 to the electronic filing system 13. After the transfer, step 422 is reached.

In step 442, the key-words stored in the KR 24 are sent via the raster interface 23 to the electronic filing system 13. Meanwhile, a key-word selection code has been added to a command by which to register images from the CAD system 11 to the electronic filing system 13. That is, the registration command comprises a source file name, a destination file name and a key-word selection code. In step 422, the key-word selection code is analyzed and suitable key-words are selected accordingly for transmission to the electronic filing system 13.

With the above-described embodiment, five types of key-words are generated in a single pass of processing. However, the present invention is not limited to the use of these five key-words. As required, one or a plurality of key-words may be generated for each drawing. Needless to say, these alternative features are also controlled by the control program of the controller 22.

Where only one type of key-words is used so that all generated key-words are registered, there is obviously no need for time key-word selection code mentioned above.

Figure 7:
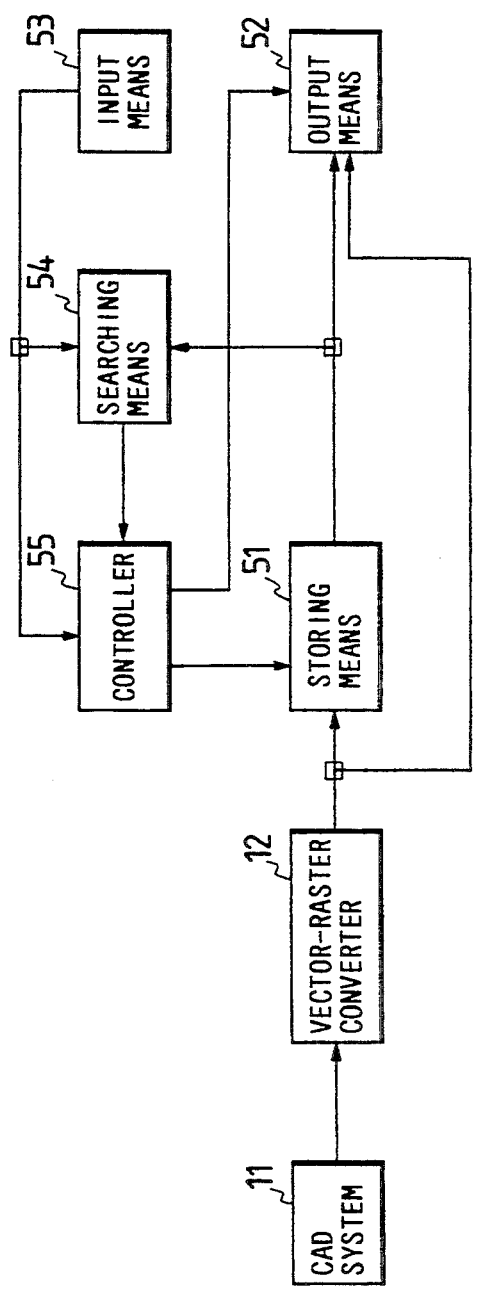
FIG. 7 is a schematic block diagram illustrating an embodiment of a system for searching image data for desired parts thereof according to the present invention.

Referring now to FIG. 7, there will be described an embodiment of a searching method for use in the filing system according to the present invention. FIG. 7 is a schematic block diagram of a system for image data search according to the invention. In this figure, a storing means 51 receives raster data (image data) and key-words from the vector-raster converter 12 for storage therein. That is, the storing means 51 is equivalent to the electronic filing system 13 off FIG. 1. In accordance with commands from a controller 55, raster data and key-words are selectively read from the stored data and are sent to an output means 52, while only the key-words are transferred to a searching means 54. According to signals from the controller 55, the output means 52 displays or otherwise outputs either the key-words from the vector-raster converter 12 or the key-words and raster data from the storing means 51. An input means 53 sends key-words to be searched for to the searching means 54 according to instructions from the operator. Furthermore, the input means sends to the controller 58 a process mode command specifying any of the following three modes: a mode in which the key-words extracted by the vector-raster converter 12 are displayed upon registration; a mode which a list of the key-words stored in the storing means 51 is displayed during search; or a mode in which the raster data stored in the storing means 51 are displayed. Upon receipt of the key-words from the storing means 51, the searching means 54 searches them for the key-words given by the input means 53, and accordingly transmits to the controller 55 the information about the address location where the data exist. Following the process mode command from the input means 53, the controller 55 tells the outpost means 52 which of the key-words and/or data are to be displayed: key-words from the vector-raster converter 12, key-words from the storing means 51, or raster data from the storing means 51. At the same time, the controller 55 receives search information from the searching means 54, and accordingly sends a signal to the storing means 51 so that the raster data corresponding to the search information received are transmitted to the output means 52.

What follows is a description of how the searching method according to the invention is typically practiced in the case where the operator knows all registered key-words during the search and directly inputs desired key-words.

Key-words are extracted automatically by the vector-raster converter 12. Thus during image data registration, the input means 53 tells the controller 55 using a command to display on the output means 52 the key-words extracted by the vector-raster converter 12. This allows the operator to know all key-words before the registration is terminated. During search, the input means 53 tells the controller 55 using a signal to output the key-words from the storing means 51 to the searching means 54. Then the operator inputs desired key-words from the input means 53. The key-words are sent to the searching means 54. The search information acquired by the searching means 54 is transferred to the controller 55. In turn, the controller 55 transmits the search information to the storing means 51 so that the latter sends the raster data corresponding to the information to the output means 52. The above processing makes it possible for the operator to input desired key-words directly and to have the output means 52 display, print or otherwise output the image data corresponding to these key-words.

Below is a description of how the searching method according to the invention is illustratively practiced in the case where the operator, not knowing the key-words registered, gets these key-words displayed and selects for input any of them on the display screen.

During search, the input means 53 tells the controller 55 using a command to send the key-words from the storing means 51 to both the output means 52 and the searching means 54. The output means 52 displays or otherwise outputs the received key-words so that the operator gets to know these key-words. In response, the operator selects desired key-words and inputs selected contents from the input means 53. The key-words and the selected contents are sent to the searching means 54. The searching means 54 generates search information based on the key-words and the suitably selected contents both previously received, and forwards the information to the controller 55. The controller 55 sends the search information to the storing means 51 so that the latter transmits the raster data corresponding to the information to the output means 52. These processes allow the operator to select desired key-words and to have the images corresponding thereto displayed, printed or otherwise output on the output device 52.

Referring now to FIG. 8, there will be described a typical configuration of the system according to the invention. Specifically, FIG. 8 shows how a system embodying the registering and searching method according to the invention is illustratively practiced. The CAD system 11 generates vector data for a target drawing, and sends the data to a CAD system interface 61. The CAD system interface 61, equivalent to the vector interface 21 in FIG. 1, accepts the vector data from the CAD system 11 and converts them to the data whose data format is compatible with a bus A 69. The converted data are sent to a vector data area 67 in a memory A 64 for storage via the bus A 69. A drawing device 62, equivalent to part of the controller 25 in FIG. 1, reads the vector data from the vector data area 67 of the memory A 64 via the bus A 69, and stores the data into a raster data area 68 of the same memory. Typically, the device may be an LSI, e.g., HD63484 (ACRTC) from Hitachi, Ltd.

A CPU A 63 and a control program area 65 of the memory A 64 correspond to the rest of the controller 25 in FIG. 1. The CPU A 63 extracts key-words in accordance with the program stored in the control program area 65 of the memory A 64 so as to control all devices connected to the bus A 69. How the CPU A 63 extracts key-words is outlined by the flowcharts in FIGS. 4 and 5. In operation, the CPU A 63 extracts data for use as key-words from the vector data stored in the vector data area 67 of the memory A 64, and stores the data in a key-word area 66 of the same memory. The icon code information table shown in FIG. 6 is stored in the key-word area 66 of the memory A 64. From the key-word area 66 of the memory A 64, the CPU A 63 reads icon code information, executes steps 443 through 446 in FIG. 5 accordingly, and stores the acquired key-words in the key-word area 66 of the same memory. Typically, the CPU A 63 may be an LSI, e.g., a general-purpose processor 80286 from Intel Inc.

The memory A 64 comprises the control program area 65, key-word area 66, vector data area 67 and raster data area 68. The control program area, equivalent to the controller 25 in FIG. 1, contains programs for executing the flows of processes depicted in FIGS. 4 and 5. The key-word area 66, equivalent to the key-word RAM 24 in FIG. 1, stores the key-words extracted by the CPU A 63 as well as the icon code information table shown in FIG. 6. The vector data area 67 and raster data area 68, equivalent to the data conversion RAM 22 in FIG. 1, store respectively the vector data of drawings generated by the CAD system 11 and the raster data after conversion. The bus A 69 is a signal conductor that implements data exchanges between the configured devices.

A bus interface 70, equivalent to the raster interface 23 in FIG. 1, converts data between the bus A 69 and a bus B 77 for data exchange.

A CPU B 71 controls all devices connected to the bus B 77 in accordance with the programs stored in a control program area 79 of a memory B 78. During search, the CPU B 71 plays the role of the controller 55 in FIG. 7. In accordance with instructions entered by the operator from a keyboard 87 via a keyboard controller 86, the CPU B 71 controls the entire system so that the information requested by the operator is outpost on an output means such as a display 76. Typically, the CPU B 71 may be an LSI, e.g., a general-purpose processor 80286 from Intel Inc.

An image processor 72 mainly comprises a data compression device 73 and a data expansion device 74. Large amounts of data need to be stored on optical disks 85. This is accomplished as follows: The data compression device 73 reads the raster data from a raster data area 80 of the memory B 78. After compressing the data, the data compression device 73 stores them in a compression data area 81 of the memory B 78. For display, the compressed data are to be expanded to the initial format of raster data that may be displayed. This is accomplished as follows: The data expansion device 74 reads the data from the compression data area 81 of the memory B 78, expands them to the initial raster data, and places the expanded data in the raster data area 80 of the same memory. Typically, the image processor 72 may be an LSI, e.g., HD63085 (DICEP) from Hitachi, Ltd.

The display controller 75, equivalent to the output means 52 in FIG. 7 and under control by the CPU B 71, selects any of the raster data from the raster data area 80 of the memory B 78, the key-words from the key-word area 82, or the key-words recorded on the optical disks 85 for output on the display 76.

The memory B 78 comprises the control program area 79, raster data area 80, compressed data area 81, and key-word area 82. The control program area 79 corresponds to part of the controller 55 in FIG. 7 and stores programs for the CPU B 71. The raster data area 80 stores the raster data coming from the raster data area 68 of the memory A 64 via the bus interface 70. The raster data area 80 also stores the raster data that were expanded by the data expansion device 74 in the image processor 72. The stored raster data are either read into the data compression device 73 in the image processor 72 for compression, or sent to the display controller 75 for display. The compressed data area 81 stores the data generated by the data compression device 73 in the image processor 72. Having been stored, the compressed data are either read into the data expansion device 74 in the image processor 72 for expansion, or sent to an optical disk controller 84 for storage. The key-word area 82 stores the key-words that were extracted by the CPU A 63, placed in the key-word area 66 of the memory A 64, and forwarded via the bus interface 70. In addition, the key-word area 82 stores the key-words that were input by the operator from the keyboard 87 and forwarded via the keyboard controller 86. The stored key-words are either read into the optical controller 84 for storage onto the optical disks 85, or sent to a key-word search device 83 for search purposes.

The key-word search device 83, equivalent to the searching means 54 in FIG. 7, searches large amounts of key-words in the key-word area 72 of the memory B 78 or on the optical disks 85 for the specific key-words that were input from the keyboard 87 and stored in the key-word area 82 of the same memory. Typically, the key-word search device may be an IC, i.e., Am95C85 (CADM) for search purposes from AMD Inc.

The optical disk controller 84 and the optical disks 85 are equivalent to the storing means 51 in FIG. 7. The optical disk controller 84 reads both the image data from the compressed data area 81 of the memory B 78 and the key-words from the key-word area 82 thereof for storage onto the optical disks 85. Conversely, the controller 84 may read image data and/or key-words from the optical disks 85 for storage into the memory B 78. The optical disks 85 are a recording medium by which to store image data and key-words. In General, key-words are stored in what is usually called an index area or directory area on the disk. The index or directory area is either stored together with the corresponding image data, or set aside for separate storage in a specific portion on the disk.

The keyboard controller 86 and the keyboard 87 are equivalent to the input means 53 in FIG. 7. When the operator inputs key-words or the like from the keyboard 87, the keyboard controller 86 sends the input contents to both the CPU B 71 and the key-word area 82 of the memory B 78. The bus B 77 is a signal conductor that implements data exchanges between the devices connected thereto.

The foregoing system configuration implements in the manner described the registering and searching method according to the present invention.

The embodiments described so far have utilized a CAD system in connection with the vector data input means. However, it is to be understood that the present invention is not limited to the use of a CAD system. As indicated, the vector data For use by the CAD system comprise data representing figures generated; code data such as characters, numerals and information constituting drawing format information; and code data such as a source file name and a destination file name. A mainframe computer may store character codes by developing them into character font patterns, regarding the character codes to be output to a printer as vector data solely comprising character information. In that case, the electronic filing system according to the invention may be connected to the mainframe for output to its printer. Where the vector data generated by some suitable means are stored on a floppy disk, magnetic tape or some other storage medium, the electronic filing system may be connected to a device capable of reading such storage medium. In addition, where the vector data which are of the nature described above and which are generated by some suitable means are placed on a transmission line, the electronic filing system may be connected to a device interfacing with that transmission line.

As described, according to the present invention, vector data generated by a CAD system or the like are converted to image data for use by an electronic filing system. During the conversion, character key-words are automatically extracted from the vector data. This makes it possible to save man-hours significantly in registering image data at high speed into the electronic filing system.

According to the invention, it is also possible to extract as key-words external form patterns that draw the operator's attention more than character type key-words. This feature considerably improves the ease of handling the man-machine interface during search operations.

Overall, the present invention eliminates the biggest bottleneck that has ever been experienced in generating key-words in prior art electronic filing systems. That is, the greatly enhanced ease of key-word generation is a significant improvement in practicing the art of electronic filing and registering of image data.

What is claimed is:

1. A method of storing image data representative of at least one document containing figures in an electronic filing system, said system having means for the storing image data representative of at least one document and key-words each corresponding to the image data representative of at least one document, means for searching the image data representative of at least one document stored in the storing means in response to search information including a desired key-word, and means for outputting image data representative of at least one document corresponding to the desired key-word as a result of the search by the searching means, the method comprising the steps of:

receiving vector data of figures contained in at least one document to be stored in said electronic filing system;

converting said vector data into image data representative of said at least one document; and producing a key-word corresponding to said image data representative of said at least one document by extracting data indicating an attribute of said figures contained in said at least one document from said vector data.

2. The registering method according to claim 1, wherein:

said attribute is a file name of said vector data and said file name is extracted as said key-word corresponding to said image data representative of said at least one document from said vector data by said producing means.

3. The registering method according to claim 1, wherein:

said attribute is title information of said vector data and said title information is extracted as said key-word corresponding to said image data representative of said at least one document from said vector data by said producing means.

4. The registering method according to claim 1, wherein:

said attribute is a maximum length value of said figures and said maximum length value is extracted as said key-word corresponding to said image data representative of said at least one document from said vector data by said producing means.

5. The registering method according to claim 1, wherein:
said attribute is a primitive/topology of the figures and said primitive/topology is extracted as said key-word corresponding to said image data representative of said at least one document from said vector data by said producing means.

6. The registering method according to claim 1, wherein:
said attribute is an icon code and said icon code data is extracted as said key-word corresponding to said image data representative of said at least one document from said vector data by obtaining continuous line data from said vector data and reducing said continuous line data by said producing means.

7. The filing apparatus according to claim 1, wherein:
said generating means generates said key-word by extracting continuous line information from said vector data as said data corresponding to said at least one predetermined attribute and reducing said continuous line information so as to produce an icon image of an icon code, said icon code being used as said key-word.

8. The filing apparatus according to claim 7, wherein:
said icon code is stored in an icon code table of said storing means as a reference icon code.

9. A method of searching image data representative of at least one document containing figures being defined by vector data stored in an electronic filing means of an image filing system, wherein the electronic filing means stores the image data representative of at least one document containing the figures, said method comprising the steps of:
selecting one of a plurality of prestored key-words, each key-word having been previously produced by extracting attribute data from said vector data and stored in corresponding relation to said image data representative of at least one document in said electronic filing means;
searching said image data representative of at least one document stored in said electronic filing means in response to said selected key-word; and
outputting image data representative of at least one document corresponding to said selected key-word as a result of said searching step.

10. An apparatus, for filing image data representative of at least one document containing figures, having means for storing the image data representative of at least one document with a key-word corresponding to each of the image data representative of at least one document, means for searching the image data representative of at least one document stored in the storing means by using a desired key-word, and means for outputting image data representative of at least one document corresponding to the desired key-word as a result of the search by the searching means, said apparatus comprising:
means for receiving vector data corresponding to figures contained in at least one document;
means for converting said vector data received by said receiving means into image data representative of said at least one document to be stored in said storing means; and
means for generating a key-word to be stored with said image data representative of said at least one document by extracting data corresponding to at least one predetermined attribute from said vector data received by said receiving means.

11. The filing apparatus according to claim 10, wherein:
said generating means generates said key-word by extracting title information from said vector data as said data corresponding to said at least one predetermined attribute.

12. The filing apparatus according to claim 8, wherein:
said generating means generates said key-word by extracting a maximum length value indicating a maximum length of the figures from said vector data as said data corresponding to said at least one predetermined attribute.

13. The filing apparatus according to claim 10, wherein:
said generating means generates said key-word by extracting one of primitive elements included in the figures contained in at least one document or a topology of a plurality of primitive elements from said vector data as said data corresponding to said at least one predetermined attribute.

14. An image filing apparatus, for storing/searching image data representative of at least one document corresponding to vector data of figures contained in said at least one document generated by a computer aided design (CAD) system, including means for storing the image data representative of at least one document in an electronic filing means with a key-word corresponding to each of the image data representative of at least one document, means for searching the image data representative of at least one document stored in the electronic filing means in response to a desired key-word, and means for outputting image data representative of at least one document and corresponding to the desired key-word as a result of the search by the searching means, said apparatus comprising:
means for receiving vector data of figures contained in at least one document to be stored from said CAD system;
means for converting the vector data contained in at least one document received by said receiving means into image data representative of said at least one document to be stored in the electronic filing means; and
means for generating a key-word to be registered in corresponding relation with the image data representative of said at least one document by extracting data corresponding to at least one predetermined attribute from the vector data contained in at least one document received by the receiving means.

15. The image filing apparatus according to claim 14, wherein:
said generating means includes means for extracting a plurality of attribute data from the vector data and means for selecting data corresponding to said at least one predetermined attribute from said plurality of attribute data.

16. A method of filing image data representative of at least one document containing figures in corresponding relation with key-words in an electronic filing system, said system including means for storing image data representative of at least one document in corresponding relation with key-words, means for searching the image data representative of at least one document stored in the storing means in response to a desired key-word, and means for outputting image data representative of at least one document corresponding to the desired key-word as a result of the search by the searching means, said method comprising the steps of:
producing vector data of figures contained in at least one document to be filed;
converting said vector data produced in said producing step into image data representative of said at least one document;
indicating an attribute of said image data representative of said at least One document to be stored as a key-word in corresponding relation with said image data representative of said at least one document;
generating said key-word by extracting data corresponding to said attribute indicated in said indicating step from said vector data; and
storing the image data representative of said at least one document and the key-word generated in said generating step into the storing means.

17. The filing method according to claim 16, wherein:
said attribute indicated in said indicating step is a file name of said vector data and said data of said file name is extracted as said key-word from said vector data.

18. The filing method according to claim 16, wherein:
said attribute indicated in said indicating step is title information of said vector data and said title information is extracted as said key-word from said vector data.

19. The filing method according to claim 16, wherein:
said attribute indicated in said indicating step is a maximum length value indicating a maximum length of the figures and said maximum length value is extracted as said key-word from said vector data.

20. The filing method according to claim 16, wherein:
said attribute indicated in said indicating step is primitive elements or a topology of primitive elements of the figures and said primitive elements or said topology of primitive elements is extracted as said key-word from said vector data.

21. The filing method according to claim 16, wherein:
said attribute indicated in said indicating step is an icon code and said icon code data is extracted from said vector data by obtaining continuous line data from said vector data and reducing said continuous line data.

22. The filing method according to claim 16, further comprising the steps of:
selecting one of a plurality of prestored key-words each prestored key-word having been previously generated by extracting data from vector data and stored in the storing means;
searching the image data representative of at least one document stored in the storing means in response to the selected key-word; and
outputting the image data representative of at least one document corresponding to said selected key-word as a result of the search by said searching step.

23. A filing system for filing image data representative of at least one document containing figures to be filed, comprising:
means for receiving vector data corresponding to the figures contained in at least one document to be filed through a transferring line;
means for converting said vector data receiving by said receiving means into image data representative of said at least one document to be filed;
means for generating a key-word to be filed in corresponding relation with the image data representative of said at least one document by extracting data corresponding to a predetermined attribute from said vector data received by said receiving means;
means for storing the image data representative of said at least one document converted by said converting means in corresponding relation with said key-word generated by said generated means;
means for searching the image data representative of said at least one document stored in said storing means in response to a desired key-word; and
means for outputting image data representative of said at least one document corresponding to said desired key-word as a result of the search by the searching means.

24. The filing system according to claim 23, wherein:
said generating means generates said key-word by extracting title information from said vector data as said data corresponding to said predetermined attribute.

25. An image data filing system for filing and searching image data representative of at least one document containing figures produced by computer aided design, comprising:
computer aided design means for producing figures contained in a least one document to be filed as vector data;
means for receiving said vector data of the figures contained in said at least one document to be filed via a transferring line from said computer aided design means;
means for converting said vector data received by said receiving means into image data representative of said at least one document of the figures contained in said at least one document to be filed;
means for generating a key-word to be filed in corresponding relation with the image data representative of said at least one document by extracting data corresponding to a predetermined attribute from said vector data received by said receiving means;
means for storing the image data representative of said at least one document converted by said converting means in corresponding relation with said key-word;
means for searching the image data representative of said at least one document stored in said storing means in response to a desired key-word; and
means for outputting image data representative of said at least one document corresponding to said desired key-word as a result of the search by the searching means.

26. An image data filing system for filing image data representative of at least one documents comprising:
means for producing code data contained in at least one document to be filed as vector data;
means for receiving said vector data of said code data contained in said at least one document to be filed via a transferring line from said producing means;
means for converting said vector data received by said receiving means into data representative of said at least one document of said code data contained in said at least one document to be filed;
means for generating a key-word to be filed in corresponding relation with the image data representative of said at least one document by extracting data corresponding to a predetermined attribute from said vector data received by said receiving means; and means for storing the image data representative of said at least one document converted by said converting means in corresponding relation with said key-word.

27. The image data fling system according to claim 26, wherein:

said code data contained in said at least one document is character code data.

28. The image data filing system according to claim 26, further comprising:

means for searching the image data representative of said at least one document stored in said storing means in response to a desired key-word; and means for outputting image data representative of said at least one document corresponding to said desired key-word as a result of the search by the searching means.

29. The image data filing system according to claim 26, wherein:

said producing means is a computer connected to said transferring line.

30. The image data filing system according to claim 29, wherein:

said code data contained in said at least one document is character code data produced by said computer.

31. The image data filing system according to claim 30, further comprising:

means for searching the image data representative of said at least one document stored in said storing means in response to a desired key-word; and means for outputting image data representative of said at least one document corresponding to said desired key-word as a result of the search by the searching means.

32. The image data filing system according to claim 30, wherein:

said image data representative of said at least one document is character font data converted by said converting means.

33. An image data filing system for filing and searching image data representative of at least one document containing figures produced by computer aided design, comprising:

computer aided design means for producing figures contained in at least one document to be filed as vector data;

means for receiving said vector data of the figures contained in said at least one document to be filed via a transferring line from said computer aided design means;

means for converting said vector data received by said receiving means into image data representative of said at least one document of the figures contained in said at least one document to be filed;

means for generating a key-word to be filed in corresponding relation with the image data representative of said at least one document from said vector data received by said receiving means;

means for storing the image data representative of said at least one document converted by said converting means in corresponding relation with said key-word;

means for searching the image data representative of said at least one document stored in said storing means in response to a desired key-word; and means for outputting image data representative of said at least one document corresponding to said desired key-word as a result of the search by the searching means.

34. The image data filing system according to claim 33, wherein:

said storing means is an optical disk apparatus.

35. An image data filing system for filing image data representative of at least one document, comprising:

means for producing code data contained in at least one document to be filed as vector data;

means for receiving said vector data of said code data contained in said at least one document to be filed via a transferring line from said producing means;

means for converting said vector data received by said receiving means into image data representative of said at least one document of said code data contained in said at least one document to be filed;

means for generating a key-word to be filed in corresponding relation with the image data representative of said at least one document from said vector data received by said receiving means;

means for storing the image data representative of said at least one document converted by said converting means in corresponding relation with said key-word;

means for searching the image data representative of said at least one document stored in said storing means in response to a desired key-word; and means for outputting image data representative of said at least one document corresponding to said desired key-word as a result of the search by the searching means.

36. The image data filing system according to claim 35, wherein:

said storing means is an optical disk apparatus.

37. The image data filing system according to claim 35, wherein:

said code data contained in said at least one document is character code data produced by said producing means.

38. The image data filing system according to claim 35, wherein:

said producing means is a computer connected to said transferring line.

39. The image data filing system according to claim 38, wherein:

said code data contained in said at least one document is character code data produced by said computer.

40. A method of retrieving image data representative of at least one document from an image database comprising the steps of:

inputting vector data of image information contained in at least one document;

converting said vector data to image data representative of said at least one document;

storing said image data representative of said at least one document and key words corresponding to said image data representative of said at least one document in the image database, said key words each including a portion of said vector data; and retrieving desired image data representative of said at least one document from said image database using said key words.

41. An apparatus for retrieving image representative of at least one document data from an image database comprising:

means for inputting vector data of image information contained in at least one document;

means or converting said vector data to image data representative of said at least one document;

means for storing said image data representative of said at least one document and key words corresponding to said image data representative of said at least one document in said image database, said key words each including a portion of said vector data; and means for retrieving desired image data representative of said at least one document from said image database using said key words.

42. A system for retrieving image data representative of at least one document from an image database comprising:

a computer for processing vector data of image information contained in at least one document;

means for inputting vector data from said computer;

means for converting said vector data to image data representative of said at least one document;

means for storing said image data representative of said at least one document and key words corresponding to said image data representative of said at least one document in said image database, said key words each including a portion of said vector data; and means for retrieving desired image data representative of said at least one document from said image database using said key words.

43. A method of retrieving image data representative of at least one document from an image database comprising the steps of:

inputting character data contained in at least one document as code data;

converting said code data to image data representative of said at least one document;

storing said image data representative of said at least one document and key words corresponding to said image data representative of said at least one document in said image database, said key words being stored as code data, and each key word including a portion of said character data contained in at least one document inputted as code data; and retrieving desired image data representative of said at least one document from said image database using said key words.

44. An apparatus for retrieving image data representative of at least one document from an image database comprising:

means for inputting character data contained in at least one document as code data;

means for converting said code data to image data representative of said at least one document;

means for storing said image data representative of said at least one document and key words corresponding to said image data in said image database, said key words being stored as code data, and each key word including a portion of said character data contained in at least one document inputted as code data; and means for retrieving desired image data representative of said at least one document from said image database using said key words.

45. A system for retrieving image data representative of at least one document from an image database comprising:

a computer for processing character data;

means for inputting character data contained in at least one document as code data;

means for converting said code data to image data representative of said at least one document;

means for storing said image data representative of said at least one document and key words corresponding to said image data representative of said at least one document in said image database, said key words being stored as code data, and each key word including a portion of said character data contained in at least one document inputted as code data; and means for retrieving desired image data representative of said at least one document from said image database using said key words.

46. A method of storing image data representative of at least one document of characters in an electronic filing system, said system having means for storing image data representative of said at least one document and key-words corresponding to the image data representative of said at least one document, means for searching the image data representative of said at least one document stored in the storing means in response to search information including a desired key-word and means for outputting image data representative of said at least one document corresponding to the desired key-word as a result of the search by the searching means, the method comprising the steps of:

receiving character code of characters contained in at least one document to be stored in said electronic filing system;

converting said character code of said characters contained in at least one document into image data representative of said at least one document; and producing key-words corresponding to said image data representative of said at least one document by extracting data indicating an attribute of said characters contained in at least one document from said character code.

47. A method of searching image data representative of at least one document of characters being defined by character code stored in an electronic filing means of an image filing system, wherein the electronic filing means stores image data representative of said at least one document of the characters, said method comprising the steps of:

selecting one of a plurality of prestored key-words, each key-word having been previously produced by extracting attribute data from said character code and stored in corresponding relation to said image data representative of said at least one document in said electronic filing means;

searching said image data representative of said at least one document stored in said electronic filing means in response to said selected key-word; and outputting image data representative of said at least one document corresponding to said selected key-word as a result of said searching step.

48. An apparatus, for filing image data representative of at least one document of characters, having means for storing image data representative of said at least one document with a key-word corresponding to each of the image data representative of said at least one document, means for searching the image data representative of said at least one document stored in the storing means by using a desired key-word, and means for outputting image data representative of said at least one document corresponding to the desired key-word as a result of the search by the searching means, said apparatus comprising:
- means for receiving character codes corresponding to said characters contained in said at least one document;
- means for converting said character codes received by said receiving means into image data representative of said at least one document to be stored in said storing means; and
- means for generating a key-word to be stored with said image data representative of said at least one document by extracting data corresponding to at least one predetermined attribute from said character codes received by said receiving means.

49. An image filing apparatus, for storing/searching image data representative of at least one document corresponding to character codes of character contained in at least one document generated by a host computer, including means for storing the image data representative of said at least one document in an electronic filing means with a key-word corresponding to each of the image data representative of said at least one document, means for searching the image data representative of said at least one document registered in the electronic filing means in response to a desired key-word, and means for outputting image data representative of said at least one document corresponding to the desired key-word as a result of the search by the searching means, said apparatus comprising:
- means for receiving character codes of characters to be stored from said host computer;
- means for converting the character codes received by said receiving means into image data representative of said at least one document to be stored in the electronic filing means; and
- means for generating a key-word to be stored in corresponding relation with the image data representative of said at least one document by extracting data corresponding to at least one predetermined attribute from the character codes received by the receiving means.

50. A method of filing image data representative of at least one document of characters contained in at least one document in corresponding relation with key-words in an electronic filing system, said system including means for storing image data representative of said at least one document in corresponding relation with key-words, means for searching the image data representative of said at least one document stored in the storing means in response to a desired key-word, and means for outputting image data representative of said at least one document corresponding to the desired key-word as a result of the search by the searching means, said method comprising the steps of:
- producing character codes of characters contained in at least one document to be filed;
- converting said character codes produced in said producing step into image data representative of said at least one document;
- indicating an attribute of said image data representative of said at least one document to be stored as a key-word in corresponding relation with said image data representative of said at least one document;
- generating said key-word by extracting data corresponding to said attribute indicated in said indicating step from said character codes; and
- storing the image data representative of said at least one document and the key-word generated in said generating step into the storing means.

51. A filing system for filing image data representative of at least one document corresponding to characters to be filed, comprising:
- means for receiving character codes corresponding to the characters contained in at least one document to be filed through a transferring line;
- means for converting said character codes received by said receiving means into image data representative of said at least one document to be filed;
- means for generating a key-word to be filed in corresponding relation with said image data representative of said at least one document by extracting data corresponding to a predetermined attribute from said character codes received by said receiving means;
- means for storing the image data representative of said at least one document converted by said converting means in corresponding relation with said key-word generated by said generating means;
- means for searching the image data representative of said at least one document stored in said storing means in response to a desired key-word; and
- means for outputting image data representative of said at least one document corresponding to said desired key-word as a result of the search by the searching means.

52. An image data filing system for filing and searching image data representative of at least one document corresponding to characters produced by a computer, comprising:
- a computer for producing the characters contained in at least one document to be filed as character codes;
- means for receiving said character codes of the characters to be filed via a transferring line from said computer;
- means for converting said character codes received by said receiving means into image representative of said at least one document data of the characters contained in at least one document to be filed;
- means for generating a key-word to be filed in corresponding relation with said image data representative of said at least one document by extracting data corresponding to a predetermined attribute from said character codes received by said receiving means;
- means for storing the image data representative of said at least one document converted by said converting means in corresponding relation with said key-word;
- means for searching the image data representative of said at least one document stored in said storing means in response to a desired key-word; and
- means for outputting image data representative of said at least one document corresponding to said desired key-word as a result of the search by the searching means.

53. An image data filing system for filing image data representative of at least one document, comprising:
- means for producing code data to be filed as character data contained in at least one document;
- means for receiving said code data of the character data contained in at least one document to be filed via a transferring line from said producing means;

means for converting said code data received by said receiving means into image data representative of said at least one document;

means for generating a key-word to be filed in corresponding relation with said image data representative of said at least one document by extracting code data from said code data received by said receiving means; and means for storing the image data representative of said at least one document converted by said converting means in corresponding relation with said key-word.

54. An image data filing system for filing image data representative of at least one document, comprising:

computing means for producing code data to be filed as character data contained in at least one document;

means for receiving said code data of the character data contained in at least one document to be filed via a transferring line from said computing means;

means for converting said code data received by said receiving means into image data representative of said at least one document of said code data to be filed;

means for generating a key-word to be filed in corresponding relation with said image data representative of said at least one document from said code data received by said receiving means;

means for storing the image data representative of said at least one document converted by said converting means in corresponding relation with said key-word;

means for searching the image data representative of said at least one document stored in said storing means in response to a desired key-word; and means for outputting image data representative of said at least one document corresponding to said desired key-word as a result of the search by the searching means.

55. An image data filing system for filing image data representative of at least one document, comprising:

means for producing code data to be filed as character data contained in at least one document;

means for receiving said code data of the character data contained in at least one document to be filed via a transferring line from said producing means;

means for converting said code data received by said receiving means into image data representative of said at least one document of said code data to be filed;

means for generating a key-word to be filed in corresponding relation with said image data representative of said at least one document from said code data received by said receiving means;

means for storing said image data representative of said at least one document converted by said converting means in corresponding relation with said key-word;

means for searching the image data representative of said at least one document stored in said storing means in response to a desired key-word; and means for outputting image data representative of said at least one document corresponding to said desired key-word as a result of the search by the searching means.

56. A method of retrieving image data representative of at least one document from an image database comprising the steps of:

inputting vector data of image information contained in at least one document;

converting said vector data to image data representative of said at least one document;

generating title information based on said vector data;

storing said title information in corresponding relation to said image data representative of said at least one document in the image database; and retrieving desired image data representative of said at least one document from said image database using said title information.

57. An apparatus for retrieving image data representative of at least one document from an image database comprising:

means for inputting vector data of image information contained in at least one document;

means or converting said vector data to image data representative of said at least one document;

means for generating title information based on said vector data;

means for storing said title information in corresponding relation to said image data representative of said at least one document in said image database; and means for retrieving desired image data representative of said at least one document from said image database using said title information.

58. A system for retrieving image data representative of at least one document from an image database comprising:

a computer for processing vector data of image information contained in at least one document;

means for inputting vector data from said computer;

means for converting said vector data to image data representative of said at least one document;

means for generating title information based on said vector data;

means for storing said title information in corresponding relation to said image data representative of said at least one document in said image database; and means for retrieving desired image data representative of said at least one document from said image database using said title information.

59. A method of retrieving image data representative of at least one document from an image database comprising the steps of:

inputting character data contained in at least one document as code data;

converting said code data to image data representative of said at least one document;

generating title information based on said code data;

storing said title information in corresponding relation to said image data representative of said at least one document in said image database, said title information being stored as code data; and retrieving desired image data representative of said at least one document from said image database using said title information.

60. An apparatus for retrieving image data representative of at least one document from an image database comprising:

means for inputting character data contained in at least one document as code data;

means for converting said code data to image data representative of said at least one document;

means for generating title information based on said code data;

means for storing said title information in corresponding relation to said image data representative of said at least one document in said image database, said title information being stored as code data; and means for retrieving desired image data representative of said at least one document from said image database using said title information.

61. A system for retrieving image data representative of at least one document from an image database comprising:

a computer for processing character data contained in at least one document;

means for inputting character data contained in at least one document as code data;

means for converting said code data to image data representative of said at least one document;

means for generating title information based on said code data;

means for storing said title information in corresponding relation to said image data representative of said at least one document in said image database, said title information being stored as code data; and means for retrieving desired image data representative of said at least one document from said image database using said title information.

62. A method of retrieving image data representative of at least one document from an image database comprising the steps of:

inputting vector data of image information contained in at least one document;

converting said vector data to image data representative of said at least one document;

storing title information in corresponding relation to said image data representative of said at least one document in the image database, said title information including a portion of said vector data; and retrieving desired image data representative of said at least one document from said image database using said title information.

63. An apparatus for retrieving image data representative of at least one document from an image database comprising:

means for inputting vector data of image information contained in at least one document;

means or converting said vector data to image data;

means for storing title information in corresponding relation to said image data representative of said at least one document in said image database, said title information including a portion of said vector data; and means for retrieving desired image data representative of said at .least one document from said image database using said title information.

64. A system for retrieving image data representative of at least one document from an image database comprising:

a computer for processing vector data of image information contained in at least one document;

means for inputting vector data from said computer;

means for converting said vector data to image data representative of said at least one document;

means for storing title information in corresponding relation to said image data representative of said at least one document in said image database, said title information including a portion of said vector data; and means for retrieving desired image data representative of said at least one document from said image database using said title information.

65. A method of retrieving image data representative of at least one document from an image database comprising the steps of:

inputting character data contained in at least one document as code data;

converting said code data to image data representative of said at least one document;

storing title information in corresponding relation to said image data representative of said at least one document in said image database, said title information being stored as code data, and said title information including a portion of said character data contained in at least one document inputted as code data; and retrieving desired image data representative of said at least one document from said image database using said title information.

66. An apparatus for retrieving image data representative of at least one document from an image database comprising:

means for inputting character data contained in at least one document as code data;

means for converting said code data to image data representative of said at least one document;

means for storing title information in corresponding relation to said image data representative of said at least one document in said image database, said title information stored as code data, and said title information including a portion of said character data contained in at least one document inputted as code data; and means for retrieving desired image data representative of said at least one document from said image database using said title information.

67. A system for retrieving image data representative of at least one document from an image database comprising:

a computer for processing character data contained in at least one document;

means for inputting character data contained in at least one document as code data;

means for converting said code data to image data representative of said at least one document;

means for storing title information in corresponding relation to said image data representative of said at least one document in said image database, said title information being stored as code data, and said title information including a portion of said character data contained in at least one document inputted as code data; and means for retrieving desired image data representative of said at least one document from said image database using said title information.

68. A filing system for filing image data corresponding to characters to be filed, comprising:

a receiving unit for receiving character code data corresponding to said characters;

a CPU for converting said character code data received by said receiving unit into image data and for generating a key-word corresponding to said image data by extracting an attribute data corresponding to at least one predetermined attribute from said character code data received by said receiving unit;

an image processing unit for compressing said image data converted by said CPU and for expanding compressed image data;

a disk for filing said image data compressed by said image processing unit in corresponding relation to said compressed image data;

an inputting unit for inputting a desired key-word;

a searching unit for searching for a desired compressed image data filed in the disk corresponding to said desired key-word inputted by the inputting unit; and a display unit for displaying said desired image data searched by said searching unit from said disk and expanded by said image processing unit.

69. A filing system according to claim 68 wherein said disk is an optical disk.

70. A filing system according to claim 68 further comprising:

a computer control unit for controlling said image processing unit, said disk, said inputting unit, said searching unit and display unit.

71. A filing system according to claim 70 wherein said computer control unit is connected to said CPU via a bus to permit compute parallel processing.

72. A filing system for filing image data corresponding to characters to be filed, comprising:

a computer system for producing character code data corresponding to said characters;

a receiving unit for receiving character code data corresponding to said characters produced by said computer system;

a CPU for converting said character code data received by said receiving unit into image data and for generating a key-word corresponding to said image data by extracting an attribute data corresponding to at least one predetermined attribute from said character code data received by said receiving unit;

an image processing unit for compressing said image data converted by said CPU and for expanding compressed image data;

a disk for filing said compressed image data compressed by said image processing unit in corresponding relation to said key-word;

an inputting unit for inputting a desired key-word;

a searching unit for searching for a desired compressed image data filed in the disk corresponding to said desired key-word inputted by the inputting unit; and a display unit for displaying said desired image data searched by said searching unit from said disk and expanded by said image processing unit.

73. A filing system according to claim 72 wherein said disk is an optical disk.

74. A filing system according to claim 72 further comprising:

a computer control unit for controlling said image processing unit, said disk, said inputting unit, said searching unit and display unit.

75. A filing system according to claim 74 wherein said computer control unit is connected to said CPU via a bus to permit compute parallel processing.

* * * * *